United States Patent [19]

Ueno

[11] Patent Number: 4,787,079
[45] Date of Patent: Nov. 22, 1988

[54] RECORDING DISK CENTERING AND CLAMPING APPARATUS

[75] Inventor: Kazumi Ueno, Tokorozawa, Japan

[73] Assignee: Teac Corporation, Tokyo, Japan

[21] Appl. No.: 154,089

[22] Filed: Feb. 9, 1988

[30] Foreign Application Priority Data

Feb. 19, 1987 [JP] Japan .................. 62-23664[U]

[51] Int. Cl.$^4$ ............................................. G11B 17/03
[52] U.S. Cl. ................................................... 369/270
[58] Field of Search ...................... 369/270, 271, 282

[56] References Cited

U.S. PATENT DOCUMENTS

| | | | |
|---|---|---|---|
| 3,768,815 | 10/1973 | Mathurin | 369/270 |
| 4,536,867 | 8/1985 | Robinson | 369/282 |
| 4,618,951 | 10/1986 | Okita et al. | 369/270 |
| 4,649,445 | 3/1987 | Sheriff | 369/270 |
| 4,689,782 | 8/1987 | Tsuchiya et al. | 369/270 |

FOREIGN PATENT DOCUMENTS

| | | | |
|---|---|---|---|
| 58-22318 | 12/1983 | Japan . | |
| 150261 | 8/1985 | Japan | 369/270 |

Primary Examiner—Steven L. Stephan
Attorney, Agent, or Firm—Woodcock Washburn Kurtz Mackiewicz & Norris

[57] ABSTRACT

A rotary clamp or collet is mounted to a load arm for movement into and out of engagement with a motor driven hub for clamping and unclamping a flexible magnetic disk. The clamp comprises a tubular body portion, and a first and a second set of clamp segments of substantially identical shape arranged radially and alternately on the body portion. Each clamp segment has a deflectable bridge portion extending radially outwardly from the body portion and terminating in a centering portion to be engagement in a socket in the drive hub through a central hole in the magnetic disk, and a clamping portion for clamping the disk against an annular surface of the drive hub around the socket. The centering portions of the first set of clamp segments are slightly more in radius than the centering portions of the second set of clamp segments, and the bridge portions of the first set of clamp segments are more deflectable than the bridge portions of the second set of clamp segments. Consequently, the first set of clamp segments serve mainly for centering the disk on the drive hub whereas the second set of clamp segments serve mainly for clamping the disk to the drive hub.

7 Claims, 5 Drawing Sheets

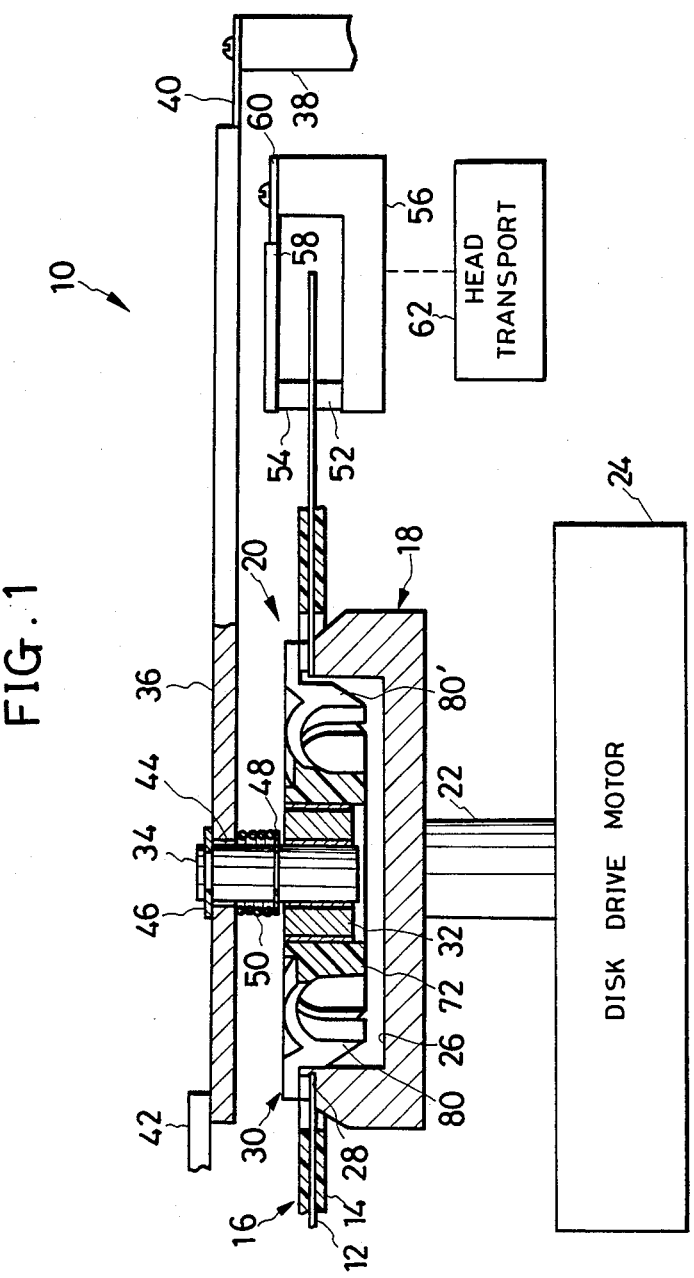

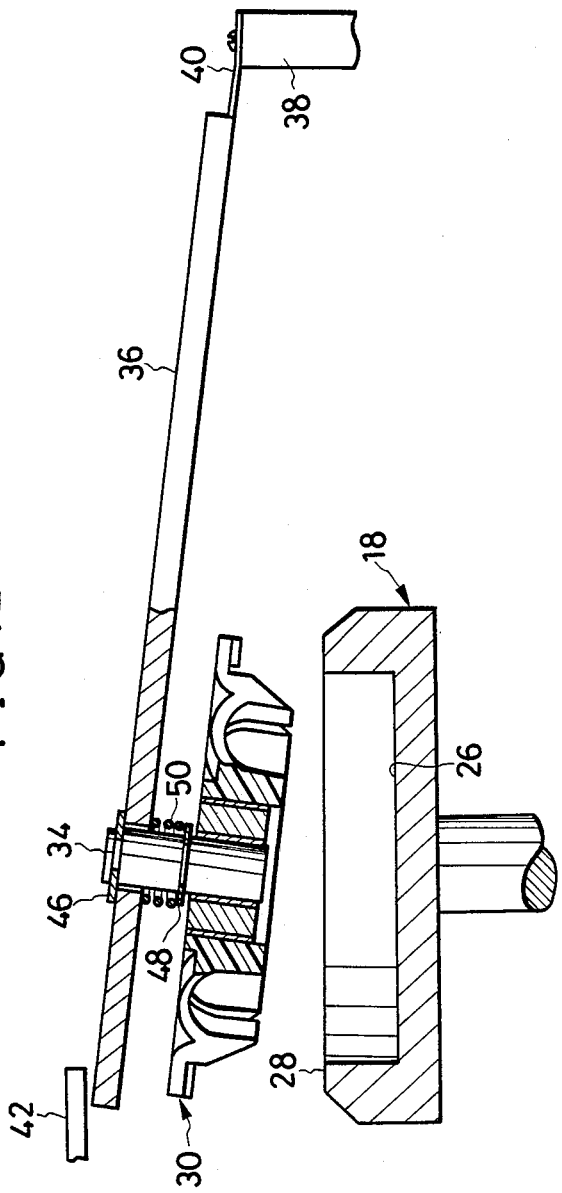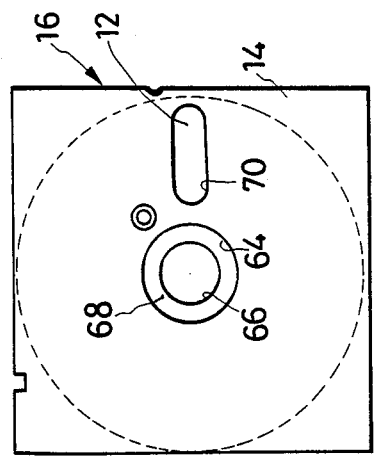

RECORDING DISK CENTERING AND CLAMPING APPARATUS

BACKGROUND OF THE INVENTION

My invention relates generally to an apparatus, generally known as a disk drive, for reading and/or writing data on a recording disk such as a flexible magnetic disk. More particularly, my invention pertains to an apparatus in such a disk drive for centering and clamping the recording disk in a preassigned position for data transfer with a transducer or a pair of transducers. Still more particularly, my invention concerns improvements in or relating to the disk centering and clamping apparatus described and claimed in U.S. Pat. No. 4,689,782 filed by Tsuchiya et al. and assigned to the assignee of the instant application.

I know several devices heretofore suggested and used for centering and clamping a flexible magnetic disk in a disk drive. Generally, such devices comprise a rotary clamp in the form of a tapered collet which is both rotatable about its own axis and movable into and out of engagement with a socketed drive hub rigidly mounted on a motor driven shaft. U.S. Pat. No. 3,768,815 to Mathurin teaches the radial splitting of the collet into several segments. The collet segments are wedged apart against the inner wall of the drive hub defining the socket, in order that the magnetic disk may be captured between collet and hub in axial alignment therewith. However, the use of the wedging means, as well as of the release springs associated with the collet, according to Mathurin makes his apparatus expensive in construction and difficult of assemblage.

One solution to the problem of how to simplify the construction of disk centering and clamping apparatus is found in Japanese Utility Model Publication No. 58-22318. It teaches a contractible collet that is pressfitted in the hub socket.

The above cross referenced U.S. Pat. No. 4,689,782 to Tsuchiya et al. represents another solution to the problem. Tsuchiya et al. also employs a segmented collet, with each segment including a deflectable, arched bridge portion joining the body portion of the clamp to one of the disk centering and clamping portions of annular arrangement. The arched resilient bridge portions enable the centering and clamping portions to positively clamp the disk even though the annular disk bearing surface of the drive hub, the substantially annular disk clamping surface of the collet, and the magnetic disk to be clamped may not necessarily be each absolutely flat.

I have found a weakness in this Tsuchiya et al. device. The weakness arises from the fact that, typically molded of a rigid plastic, the clamp is subject to change in size with ambient temperatures. The centering portions of the clamp on thermal expansion will not easily fit in the socket in the drive hub. On thermal contraction, then, the centering portions of the clamp will have play with respect to the drive hub socket, with the consequent possibility of disk misalignment on the hub. An obvious remedy for this weakness might be to make the centering portions large enough to fit closely in the hub socket even at low temperatures and, at the same time, to increase the elasticity of the bridge portions. Then the centering portions would elastically fit in the hub socket even at high temperatures. However, such an increase in the elasticity of the bridge portions would invite a decrease in the force under which the clamping portions of the clamp urge the disk against the drive hub.

SUMMARY OF THE INVENTION

I have hereby invented how to enhance both the clamping and centering capabilities of disk clamping apparatus of the type in question and to maintain such enhanced capabilities over a wide range of temperatures in which the apparatus is expected to operate.

In summary my invention concerns an apparatus for centering and clamping a recording disk in a disk drive, comprising a drive hub having a socket defined therein and also having an annular disk bearing surface around the socket for supporting the recording disk. Movable into and out of clamping engagement with the drive hub via the recording disk is a rotary clamp comprising a body portion, and a plurality of clamp segments extending radially outwardly of the body portion each for clamping the recording disk to the disk bearing surface of the drive hub and for centering the recording disk on the drive hub. Some of the clamp segments are effective principally for centering the recording disk on the drive hub thereas the others are effective principally for clamping the recording disk to the drive hub.

Preferably, as in an embodiment of the invention disclosed herein, a first and a second set of clamp segments of substantially identical shape are arranged radially and alternately on the body portion. Each clamp segment comprises a deflectable bridge portion extending radially outwardly from the body portion and terminating in a centering portion to be engaged in the socket in the drive hub through a central hole in the recording disk for centering the same on the drive hub, and in a clamping portion for clamping the recording disk against the disk bearing surface of the drive hub. The first set of clamp segments are intended principally for centering the recording disk on the drive hub, and the second set of clamp segments principally for clamping the recording disk to the drive hub. Toward these ends the centering portions of the first set of clamp segments made greater in radius than those of the second set of clamp segments. Further the bridge protions of the first set of clamp segments are made more deflectable than those of the second set of clamp segments.

The improved clamp construction in accordance with my invention overcomes the difficulties pointed out in connection with the prior art. The centering portions of the first set of clamp segments, intended mainly for the centering purpose, may be sized to closely fit in the hub socket even at low ambient temperatures. Since the bridge portions of the first set of clamp segments are more elastic than those of the second set of clamp segments, the centering portions of the first set of clamp segments will elastically fit in the hub socket even upon thermal expansion of the clamp. The centering portions of the second set of clamp segments, on the other hand, being primarily for the clamping purpose, may be sized to fit somewhat loosely in the hub socket at low ambient temperatures, but their bridge portions may be made sufficiently strong to enable their clamping portions to positively clamp the disk against the drive hub.

The above and other features and advantages of my invention and the manner of realizing them will become more apparent, and the invention itself will best be understood, from a study of the following description and appended claims, with reference had to the attached drawings showing some preferable embodiments of my invention.

BRIEF DESCRIPTION OF THE DRAWINGS

FIG. 1 is a diagrammatic elevation, with parts shown in section for clarity; of some essential parts of a flexible magnetic disk drive including the disk centering and clamping apparatus of my invention, with the rotary clamp of the apparatus shown in a clamping position;

FIG. 2 is an axial section through the disk centering and clamping apparatus of FIG. 1, with the rotary clamp is shown in an unclamping position;

FIG. 3 is a plan view of a double sided flexible magnetic disk cartridge for use with the disk drive of FIG. 1.

DESCRIPTION OF THE PREFERRED EMBODIMENTS

General

Figure 4:
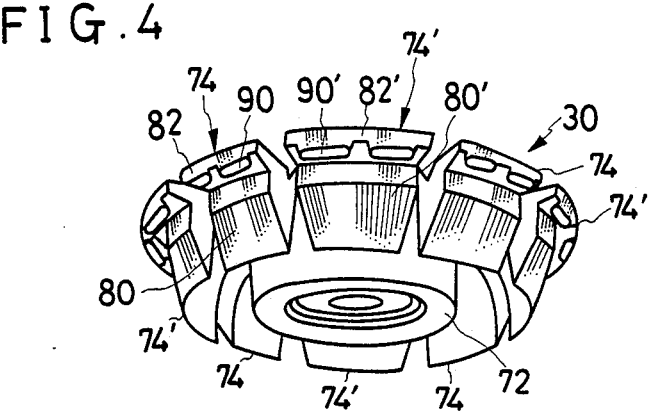
FIG. 4 is a perspective view of the rotary clamp of the disk centering and clamping apparatus.
Figure 5:
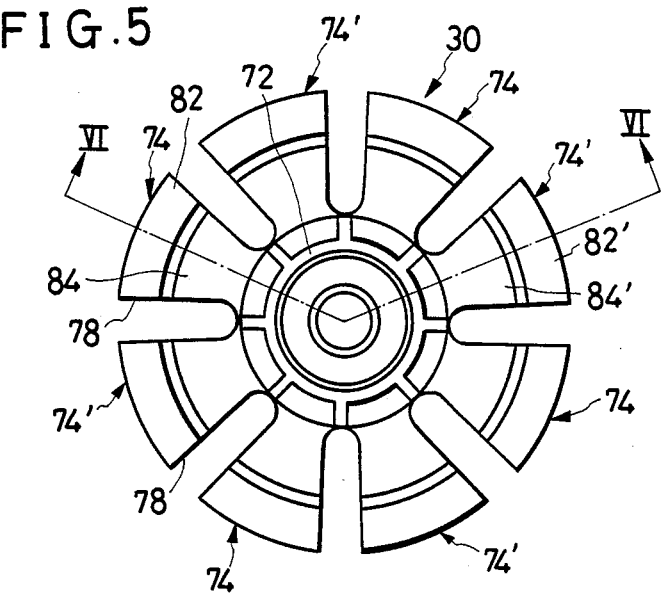
FIG. 5 is a top plan of the rotary clamp.

I will first describe the general makeup of the disk drive incorporating the improved disk centering and clamping mechanism in accordance with my invention, only to an extent necessary for a full understanding of the invention. Generally designated 10 in FIG. 1, the disk drive is therein shown adapted for use with a double sided flexible magnetic disk 12. The magnetic disk 12 is rotatably housed in a protective envelope 14 to make up a disk cartridge 16 which is to be detailed subsequently. The disk drive 10 has a drive hub 18 forming a part of the disk centering and clamping mechanism 20 for clamping the magnetic disk 12 in a preassigned data transfer position as shown in FIG. 1. The drive hub 18 is herein shown mounted directly on the top of an upstanding output shaft 22 of an electric disk drive motor 24 for joint rotation therewith. A socket 26 is defined concentrically in the top face of the drive hub 18, with an annular disk bearing surface 28 left around the socket.

Another important component of the disk centering and clamping mechanism 20 is a rotary clamp or collet 30 rotatably mounted via a sleeve bearing 32 on a shaft 34. This shaft 34 is mounted in turn on a distal end of a clamp arm 36 proximally pivoted on a fixed support 38 via a cantilever spring 40. Thus the rotary clamp 30 is movable between a clamping position of FIG. 1, where the clamp engages the drive hub 18 for clamping the magnetic disk 12 therebetween, and an unclamping position of FIG. 2 where the clamp disengages the drive hub and so unclamps the magnetic disk. The cantilever spring 40 biases the clamp arm 36 from the clamping toward the unclamping position. Forming a part of the known clamp actuating mechanism, a clamp actuating member 42 operates to move the clamp arm 36 from the unclamping to the clamping position against the force of the cantilever spring 40. The axis of rotation of the clamp 30 on the clamp arm 36 is in line with that of the drive hub 18 when the clamp is in the clamping position. The clamp 30 is therefore rotatable with the drive hub 18 when engaged therewith, as well as with the magnetic disk 12 captured therebetween.

The shaft 34 rotatably carrying the clamp 30 slidably extends through a hole 44 in the clamp arm 36 for axial displacement. A collar 46 is mounted on one end of the shaft 34 protruding from the hole 44 in a direction away from the clamp 30, and another collar 48 is also mounted on the shaft 34 in a position spaced from the clamp arm 36 toward the clamp 30. A helical compression spring 50 is sleeved upon the shaft 34 so as to intervene between the clamp arm 36 and the second mentioned collar 48. Accordingly, the shaft 34 together with the clamp 30 thereon is sprung with respect to the clamp arm 36 toward the drive hub 18, with the collar 46 normally butting on the clamp arm 36 to limit the shaft displacement in that direction. The clamp 30 is displaceable toward the clamp arm 36 against the bias of the compression spring 50 at the time of disk clamping engagement with the drive hub.

FIG. 1 further shows a pair of transducers or magnetic head assemblies 52 and 54 disposed on the opposite sides of the magnetic disk 12 for data transfer with its opposite faces. The lower head assembly 52 is mounted directly on a carriage 56 whereas the upper head assembly 54 is mounted on a load arm 58 which is pivoted on the carriage 56 via a cantilever spring 60. The upper head assembly 54 is movable into and out of forced contact with the lower head assembly 52 via the magnetic disk 12. The carriage 56 is coupled to a head transport mechanism, shown in block form and designated 62, thereby to be reciprocably and incrementally transported radially of the magnetic disk 12 to enable the head assemblies 52 and 54 to access the individual data storage tracks on the magnetic disk. Typically, the head transport mechanism 62 comprises an electrical stepping motor coupled to the carriage 56 via a motion translating mechanism such as a lead screw, a steel belt or a rack and pinion arrangement.

Flexible Magnetic Disk Cartridge

I have illustrated in FIG. 3 the disk cartridge 16 for use with the disk drive 10 of FIG. 1. The disk cartridge 16 has the flexible magnetic disk 12 rotatably housed as aforesaid in the protective envelope 14. This envelope has formed in each of its oppsite sides a central aperture 64 larger than a concentric central hole 66 in the magnetic disk 12 to expose its annular portion 68 around the hole 66. It is this annular portion 68 of the magnetic disk 12 that is to be captured between drive hub 18 and rotary clamp 30 of the disk centering and clamping mechanism 20 when the clamp is in the clamping position of FIG. 1. Also formed in each side of the envelope 14 is a slot 70 to expose a radial portion of the magnetic disk 12 for data transfer contact with one of the magnetic head assemblies 52 and 54.

Rotary Clamp

I will now proceed to the detailed study of the rotary clamp 30, one of hte components of the disk centering and clamping mechanism 20, forming the gist of my invention. As illustrated in detail in FIGS. 4–7, the clamp 30 can be a unitary plastic molding composed of a central tubular body portion 72 sleeved upon the shaft 34 via the sleeve bearing 32, and first 74 and second 74' sets of clamp segments arranged radially and alternately on the body portion 72, with slots 78 separating the individual clamp segments. Four clamp segments 74 constitute the first set, and another four clamp segments 74' constitute the second set, in this particular embodiment. The two sets of clamp segments 74 and 74' are substantially alike in shape but slightly differ in some dimensions, as set forth hereafter.

The first set of clamp segments 74 are all identical in shape and size, each comprising a centering portion 80 to fit in the socket 26, FIGS. 1 and 2, in the drive hub 18 through the central hole 66 in the magnetic disk 12, a clamping portion 82 for clamping the exposed annular portion 68 of the magnetic disk against the disk bearing surface 28 of the drive hub, and an arcuate, deflectable bridge portion 84 resiliently joining the associated centering and clamping portions to the body portion 72. Generally extending in parallel spaced relation to the tubular body portion 72, each centering portion 80 has a sloping outer surface 86, located closer to the drive hub 18, and a nonsloping outer surface 88 disposed farther away from the drive hub. Each clamping portion 82 is shaped as a tab extending radially outwardly from one end, away from the dribe hub 18, of the associated centering portion 80.

Since the second set of clamp segments 74' are substantially similar in shape to the first set of clamp segments 74, I will identify the various parts of each second clamp segment by priming the reference numberals used to denote the corresponding parts of each first clamp segment. Thus each second clamp segment 74' comprises a centering portion 80' having a sloping outer surface 86' and nonsloping outer surface 88', a clamping portion 82' and a bridge portion 84'.

All the centering portions 80 and 80' and all the clamping portions 82 and 82' of the clamp segments 74 and 74' are of annular arrangement, concentrically surrounding the body portion 72. Therefore, as a whole, the clamp 30 takes the form of a flanged, tapered collet with the radial slots 78 cut therein at constant angular spacings to provide the individually deflectable clamp segments 74 and 74'. The nonsloping surfaces 88 and 88' of the clamp segments 74 and 74' form in combination a substantially, and not exactly, cylindrical surface for centering the magnetic disk 12 on the drive hub 18 by being received in the hub socket 26 through the central hole 66 in the disk. The sloping surfaces 86 and 86' of the clamp segments 74 and 74' conjointly serve to taper one end portion, directed toward the drive hub 18, of the clamp 30 for the ease of insertion in the hub socket 26 through the disk hole 66.

The clamping portions 82 and 82' of the clamp segments 74 and 74' form in combination a flange around the collet, coming into register with the disk bearing surface 28, FIGS. 1 and 2, of the drive hub 18 upon engagement of the clamp 30 with the drive hub as shown in FIG. 1. Each clamping portion 82 or 82' is formed to include one or more, two in the illustrated embodiment, protuberances 90 or 90' for pressing the exposed annular portion 68, FIG. 3, of the magnetic disk 12 against the disk bearing surface 28 of the drive hub 18.

Each of the deflectable bridge portions 84 and 84' of the clamp segments 74 and 74' extend between those ends of the associated centering and body portions which are away from the drive hub 18. Further, as seen in a plane containing the axis of the clamp 30 as in FIG. 6, each bridge portion 84 and 84' is arched in shape. Thus the bridge portions are compactly disposed between the centering and body portions but, nevertheless, have a sufficient length to afford a required degree of deflection even if they are made thick enough to resist breakage or warpage in use.

I have so far described the clamp segment configuration common to both sets of segments 74 and 75'. The two sets of clamp segments differ in the following respects.

Figure 6:
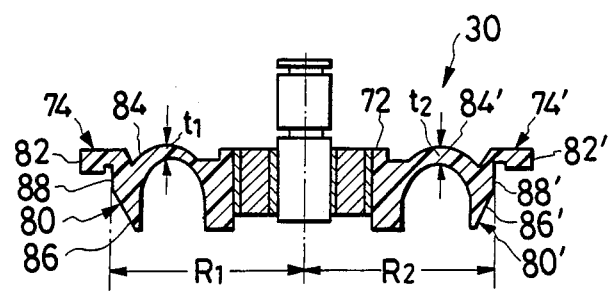
FIG. 6 is a section through the rotary clamp, taken along the line VI—VI in FIG. 5.
Figure 7:
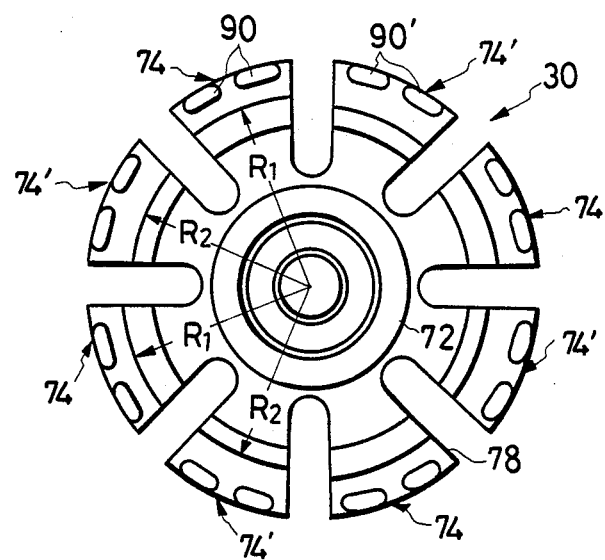
FIG. 7 is a bottom plan of the rotary clamp.

As best manifested by FIG. 6, one of the differences is between the maximum radius R1 of the centering portion 80 of each first clamp segment 74 and the maximum radius R2 of the centering portion 80' of each second clamp segment 74'. The maximum radius R1 is greater than the maximum radius R2 in accordance with a constructional feature of my invention. By the "maximum radii R1 and R2" I mean the radii of the nonsloping outer surfaces 88 and 88' of the centering portions 80 and 80', respectively. Thus the nonsloping outer surfaces 88 of the first set of clamp segments 74 are at a greater distance from the axis of the clamp 30 than are the nonsloping outer surfaces 88' of the second set of clamp segments 74'.

For the best results the maximum radius R1 of the centering portion 80 of each first clamp segment 74 may be so determined as to be approximately equal to the radius of the socket 26 in the drive hub 18 when the ambient temperature is as low as, say, four degrees centigrade. The maximum radius R2 of the centering portion 80' of each second clamp segment 74' may be from 0.1 to 0.2 millimeter less than the maximum radius R1 at the same temperature.

It is another constructional feature of my invention that the thickness t1, FIG. 6, of the arcuate bridge portion 84 of each first clamp segment 74 is less than the thickness t2 of the bridge portion 84' of each second clamp segment 74'. The thicknesses t1 and t2 of the bridge portions 84 and 84' are both measured in a direction parallel to the axis of the clamp 30. The reduced thickness of the bridge portion 84 of each first clamp segment 74 makes it more easily deflectable than the brdige portion 84' of each second clamp segment 74'.

The foregoing two structural differences between the first and second sets of clamp segments 74 and 74' impart distinctly different functions to them. The first set of clamp segments 74 function mainly for centering the magnetic disk 12 on the drive hub 18 whereas the second set of clamp segments 74' function mainly for clamping the magnetic disk to the drive hub, as will become more apparent from the following description of operation.

Operation

I understand that the various parts and components of the disk drive 10 shown in FIG. 1 are all mounted in a housing, not shown, of conventional make having an disk entrance slot on the left hand side of FIGS. 1 and 2. The flexible magnetic disk cartridge 16 is to be loaded in the disk drive 10 through this entrance slot, with the rotary clamp 30 held in the unclamping position of FIG. 2. The magnetic disk 12 will become approximately concentric with the drive hub 18 upon full insertion of the disk cartridge 16.

Then the disk drive motor 24 may be set into rotation for driving the drive hub 18, and at the same time the clamp arm 36 may be pivoted by the clamp actuating member 42 from the unclamping position of FIG. 2 toward the clamping position of FIG. 1. The centering portions 80 and 80' of the clamp 30 on the clamp arm 36 will then become engaged in the socket 26 in the revolving drive hub 18 through the central hole 66 in the magnetic disk 12. The magnetic disk 12 will be centered on the drive hub 18 as the sloping surfaces 86 and the nonsloping surfaces 88 of the centering portions 80 of the first set of clamp segments 74, in particular, become successively received in the drive hub socket 26 through the disk hole 66.

Upon completion of the pivotal motion of the clamp arm 36 to the clamping position, the clamping portions 82' of the second set of clamp segments 74' in particulr will press the exposed annular portion 68 of the magnetic disk 12 against the disk bearing surface 28 of the drive hub 18. The magnetic disk 12 has now been clamped in position between drive hub 18 and rotary clamp 30 and so has started rotation therewith.

Let us assume that the radius R1 of the nonsloping outer surface 88 of the centering portion 80 of each first clamp segment 74 is designed to be equal to the radius of the hub socket 26 at a temperature of four degrees centigrade. The radius R1 will exceed the hub socket radius at higher temperatures and may also exceed the hub socket radius because of unavoidable dimensional errors. The centering portions 80 of the first set of clamp segments 74 will nevertheless fit in the hub socket 26 by virtue of the elastic deformation of the deflectable bridge portions 84. It will be appreciated that the thickness t1 of each of these bridge portions 84 is sufficiently small to permit its elastic deformation to an extent necessary for the full engagement of such possibly larger centering portions 80 in the hub socket 26.

Such close engagement of the centering portions 80 in the drive hub socket 26 makes the first set of clamp segments 74 well adapted for precisely centering the magnetic disk 12 on the drive hub 18. However, because of the increased elasticity of their bridge portions 84, the force of the load arm 36 will be mostly consumed in the displacement of the centering portions 80, instead of being used for clamping the magnetic disk 12 by the clamping portions 82. The first set of clamp segments 74 will serve no great purpose for clamping the magnetic disk 12 to the drive hub 18.

The radius R2 of the nonsloping outer surface 88' of the centering portion 80' of each second clamp segment 74', on the other hand, is designed to be less than the radius of the hub socket 26 even when the ambient temperature is as high as, say, 46 degrees centigrade. The radius R2 may exceed the hub socket radius at such high temperatures because of the dimensional errors of the mating parts. However, if the errors are within the tolerance limits, the radius R2 will not exceed the hub socket radius to such an extent as to make impossible, or even difficult, the engagement of the centering portions 80' of the second set of clamp segments 74' in the hub socket 26. The centering portions 80' of the second set of clamp segments 74' will somewhat loosely fit in the hub socket 26 in the normal range of temperatures at which the disk drive 10 is expected to operate.

Less centering effect can therefore be expected from the second set of clamp segments 74' than from the first set 74. They do, however, function to positively clamp the magnetic disk 12 against the disk bearing surface 28 of the drive hub 18. For the force of the load arm 36 is efficiently transmitted from the clamp body portion 72 to the clamping portions 82' of the second set of clamp segments 74' by reasons of the loose engagement of their centering portions 80' in the drive hub socket 26, and of the reduced elasticity of their bridge portions 84'.

The clamp actuating member 42 should be capable of depressing the clamp arm 32 so that the clamping portions 82' of the second set of clamp segments 74' press the exposed annular portion 68 of the magnetic disk 12 against the disk bearing surface 28 of the drive hub 18 under sufficiently high pressure to firmly clamp the disk in the face of the possible unevenness of the disk bearing surface and of the magnetic disk. If the disk bearing surface 24 or the magnetic disk 12 or both are not exactly flat, one or more of the clamping portions 82' of the second set of clamp segments 74' will first come into engagement with the disk bearing surface via the magnetic disk. Then, with the continued descent of the clamp 30, the bridge portions 84' of such clamp segments will deflect to permit the clamping portions 82' of the other clamp segments 74' to come into contact with the drive hub 18 via the magnetic disk 12.

It is now clear that the first set of clamp segments 74 with their larger centering portions 80 and more deflectable bridge portions 84 function primarily for centering the magnetic disk 12 on the drive hub 18, and the second set of clamp segments 74' with their smaller centering portions 80' and less deflectable bridge portions 84' function primarily for clamping the magnetic disk 12. All in all, the centering and clamping mechanism 20 in accordance with my invention will favorably perform both centering and clamping functions in as wide a temperature range as from four to 46 degrees centigrade.

ALTERNATIVE FORM

Figure 8:
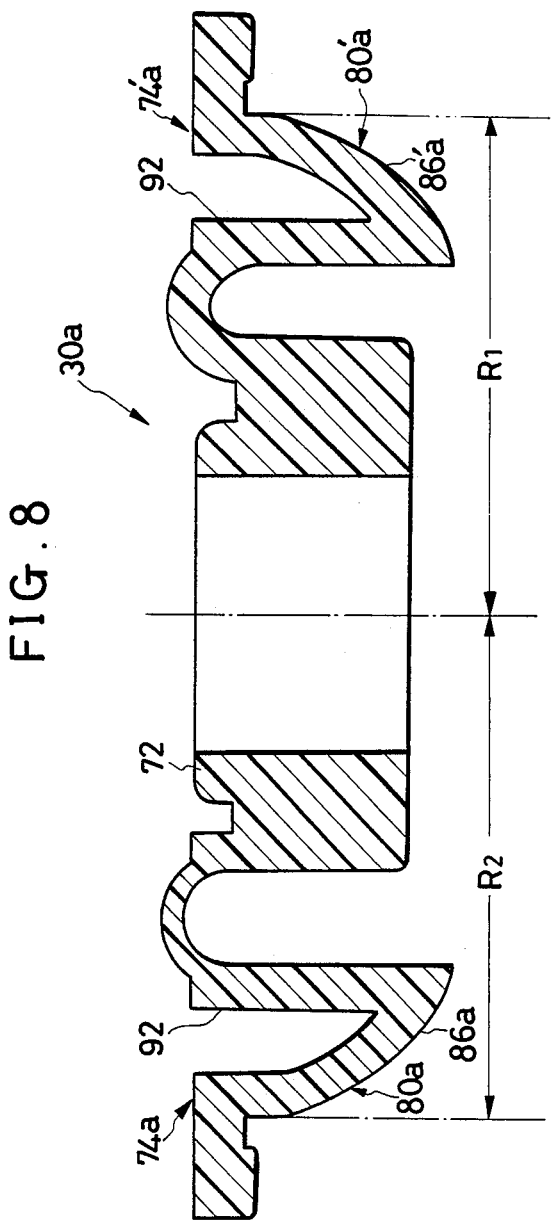
FIG. 8 is an axial section through an alternative form of rotary clamp in accordance with my invention.

FIG. 8 shows another preferred form of rotary clamp 30a which may be used in the disk drive 10 of FIG. 1 in substitution for the clamp 30. The alternative clamp 30a also has a first set of clamp segments 74a and a second set of clamp segments 74'a arranged alternately on the tubular body portion 72. The centering portions 80a and 80'a of these clamp segments differ from those of the preceding embodiment in that their sloping outer surfaces 86a and 86'a are each formed by a combination of surface portions set at different angles to each other. As a further alternative, these outer surfaces of the centering portions may be arched or convexed as seen in a plane containing the axis of the clamp.

The alternative clamp 30a also features a recess or hollow 92 formed in each of the centering portions 80a and 80'a for the lighter weight of the clamp 30a and the higher resiliency of the individual clamp segments 74a and 74'a. The other details of construction and operation can be substantially as set forth above in conjunction with the FIGS. 1–7 embodiment.

Possible Modifications

Notwithstanding the foregoing detailed disclosure I do not wish my invention to be limited by the exact details of the illustrated embodiments. The following is a brief list of possible modifications or alterations of the disclosed embodiments which I believe fall within the scope of my invention:

1. The clamping portions of the first set of clamp segments, being designed primarily for centering the disk, may be eliminated if the disk can be clamped firmly enough by the clamping portions of the second set of clamp segments.

2. The centering portions may likewise be removed from the second set of clamp segments, the latter being designed primarily for clamping the disk. Preferably, however, the second set of clamp segments should include the centering portions for the smoother insertion of the centering portions of the first set of clamp segments into and through the hole in the magnetic disk.

3. The bridge portions of the first set of clamp segments may be made more deflectable than those of the second set of clamp segments by making them different in dimensions other than that parallel to the clamp axis.

4. The centering portions of the clamp segments may be wholly tapered instead of being partly tapered as in the illustrated embodiment.

5. The rotary clamp may not be mounted to the pivotal clamp arm but may be made movable axially into and out of engagement with the drive hub.

6. The centering portions of the first set of clamp segments may closely, instead of loosely, fit in the drive hub socket even at low temperatures.

7. The nonsloping outer surfaces of the centering portions of the first set of clamp segments may be designed to be equal in radius to the drive hub socket at room temperature.

What I claim is:

1. An apparatus for centering and clamping a recording disk in a disk drive, comprising:
   (a) a drive hub having a socket defined therein and also having an annular disk bearing surface around the socket for supporting the recording disk;
   (b) a rotary clamp movable into and out of clamping engagement with the drive hub via the recording disk, the clamp comprising a body portion, and a plurality of clamp segments extending radially outwardly of the body portion each for clamping the recording disk to the disk bearing surface of the drive hub and for centering the recording disk on the drive hub, some of the clamp segments being effective principally for centering the recording disk on the drive hub, the other clamp segments being effective principally for clamping the recording disk to the drive hub; and
   (c) means for moving the rotary clamp into and out of engagement with the drive hub for clamping and unclamping the recording disk.

2. An apparatus for centering and clamping a recording disk in a disk drive, comprising:
   (a) a drive hub having a socket defined therein and also having an annular disk bearing surface around the socket for supporting the recording disk;
   (b) a rotary clamp movable into and out of clamping engagement with the drive hub via the recording disk, the clamp comprising a body portion, and a first and a second set of clamp segments of substantially identical shape extending radially outwardly of the body portion and each terminating in a centering portion to be engaged in the socket in the drive hub through a central hole in the recording disk for centering the same on the drive hub, and in a clamping portion for clamping the recording disk against the disk bearing surface of the drive hub, the first set of clamp segments being effective principally for centering the recording disk on the drive hub, the second set of clamp segments being effective principally for clamping the recording disk to the drive hub; and
   (c) means for moving the rotary clamp into and out of engagement with the drive hub for clamping and unclamping the recording disk.

3. The disk centering and clamping apparatus of claim 2 wherein the first and the second sets of clamp segments are arranged alternately.

4. An apparatus for centering and clamping a recording disk in a disk drive, comprising:
   (a) a drive hub having a socket defined therein and also having an annular disk bearing surface around the socket for supporting the recording disk;
   (b) a rotary clamp movable into and out of clamping engagement with the drive hub via the recording disk, the rotary clamp comprising a body portion, and a first and a second set of clamp segments of substantially identical shape arranged radially and alternately on the body portion, each clamp segment comprising a deflectable bridge portion which extends radially outwardly from the body portion and which terminates in a centering portion to be engaged in the socket in the drive hub through a central hole in the recording disk for centering the same on the drive hub, and in a clamping portion for clamping the recording disk against the disk bearing surface of the drive hub, the centering portions of the first set of clamp segments being greater in radius than the centering portions of the second set of clamp segments, the bridge portions of the first set of clamp segments being more deflectable than the bridge portions of the second set of clamp segments, whereby the first set of clamp segments serve principally for centering the recording disk on the drive hub whereas the second set of clamp segments serve principally for clamping the recording disk to the drive hub; and
   (c) means for moving the rotary clamp into and out of engagement with the drive hub for clamping and unclamping the recording disk.

5. The disk centering and clamping apparatus of claim 4 wherein the centering portions of the first and second sets of clamp segments of the rotary clamp are arranged annularly about the body portion, each centering portion having a sloping outer surface located closer to the drive hub, and a nonsloping outer surface extending from the sloping outer surface in a direction away from the drive hub, so that the centering portions as a whole have a tapered portion formed by the sloping outer surfaces and a cylindrical portion formed by the nonsloping outer surfaces, the radius of the nonsloping outer surfaces of the centering portions of the first set of clamp segments being greater than the radius of the nonsloping outer surfaces of the centering portions of the second set of clamp segments.

6. The disk centering and clamping apparatus of claim 4 wherein the bridge portions of the first and second sets of clamp segments are are arched in shape as seen in an axial plane of the rotary clamp, and wherein the bridge portions of the first set of clamp segments are less in a dimension parallel to the axis of the rotary clamp than than the bridge portions of the second set of clamp segments.

7. The disk centering and clamping apparatus of claim 4 wherein the rotary clamp is a unitary molding of a plastic.

* * * * *